United States Patent [19]

Lulloff et al.

[11] Patent Number: 4,977,741

[45] Date of Patent: Dec. 18, 1990

[54] COMBINATION EXHAUST MANIFOLD AND EXHAUST ELBOW FOR MARINE PROPULSION SYSTEM

[75] Inventors: Ricky H. Lulloff, Neenah; Jeffrey P. Ruhnke, Fond du Lac; Robert C. Lloyd, Oshkosh, all of Wis.

[73] Assignee: Brunswick Corporation, Skokie, Ill.

[21] Appl. No.: 343,019

[22] Filed: Apr. 25, 1989

Related U.S. Application Data

[63] Continuation-in-part of Ser. No. 177,677, Apr. 5, 1988, abandoned.

[51] Int. Cl.$^5$ ............................ F01N 3/02; F01N 7/10
[52] U.S. Cl. ......................................... 60/310; 60/321
[58] Field of Search ................... 60/310, 320, 321, 323

[56] References Cited

U.S. PATENT DOCUMENTS

| | | | |
|---|---|---|---|
| 2,060,187 | 11/1936 | Fernstrum | 60/321 |
| 3,765,479 | 10/1973 | Fish | |
| 3,780,712 | 12/1973 | Pace | |
| 4,573,318 | 3/1986 | Entringer et al. | |
| 4,711,088 | 12/1987 | Berchem | 60/321 |

Primary Examiner—Douglas Hart

Attorney, Agent, or Firm—Andrus, Sceales, Starke & Sawall

[57] ABSTRACT

A combination exhaust manifold and exhaust elbow for an internal combustion engine includes an exhaust cavity for receiving exhaust from the engine, an exhaust passage leading from the exhaust cavity, and an exhaust discharge outlet. A first water jacket is provided around the exhaust cavity and a second water jacket is provided around the exhaust discharge passage. A dam is provided between the first and second water jackets, having a passage therein for allowing fluid communication between the first and second water jackets. A warm water inlet is provided in the first water jacket around the exhaust cavity for receiving cooling water which has been warmed by the engine, and which flow is controlled by a temperature sensitive thermostat. A cold water inlet is provided adjacent the discharge exhaust passage. The cold water inlet is disposed either upstream or downstream of the dam adjacent the exhaust passage, and allows cold bypass water to be discharged without the necessity of the cold water flowing through the entire assembly, so as to prevent moisture from condensing out of the exhaust in the exhaust cavity.

22 Claims, 4 Drawing Sheets

FIG. I
PRIOR ART

COMBINATION EXHAUST MANIFOLD AND EXHAUST ELBOW FOR MARINE PROPULSION SYSTEM

CROSS REFERENCE TO RELATED APPLICATION

This application is a continuation-in-part of application Ser. No. 07/177,677 filed Apr. 5, 1988 and now abandoned.

BACKGROUND AND SUMMARY

This invention relates to a marine propulsion system in which exhaust is discharged from the engine into a water jacketed manifold, and in which engine coolant water is discharged into the engine combustion product exhaust.

In a marine propulsion system, it is known to provide a combination exhaust manifold and exhaust elbow in which the manifold is surrounded by a water jacket and in which the engine coolant water in the water jacket is mixed with the engine exhaust at discharge from the manifold and elbow. In known systems, one or more water inlets for the water jacket around the exhaust manifold are provided adjacent or along the base of the exhaust manifold. After circulation through the engine cooling system, engine coolant water passes through the manifold water jacket inlet and flows through the manifold water jacket prior to passage into the exhaust elbow for discharge into the engine exhaust. The single manifold water jacket inlet receives water having a wide range of temperatures. For example, during start-up and low speed operation, engine coolant water exiting the engine cooling system is relatively cold, having been supplied from a lake or other body of water and absorbing little heat from the engine during passage through the engine cooling system. In this circumstance, the relatively cold water flowing through the water jacket around the exhaust manifold will maintain the walls of the exhaust cavity within the exhaust manifold at a like temperature. Under these conditions, it is possible for moisture to condense out of the engine exhaust. Such condensation can damage the engine, especially at idle or after shutdown.

The present invention is designed to eliminate such formation of harmful condensate and to provide a more efficient and effective method of cooling a marine engine exhaust manifold. In accordance with the invention, a water jacketed exhaust discharge assembly includes an exhaust manifold having an exhaust cavity and a discharge exhaust passage leading therefrom. Water jacket means is provided around the exhaust discharge passage and the exhaust cavity for cooling the engine exhaust prior to discharge. A first inlet is provided for introducing water into the water jacket means around the exhaust cavity. The water passing through the first inlet is warmed prior to entrance therein, and the flow of such water is controlled by a temperature sensitive flow control means, such as a thermostat. A second inlet is provided for introducing unwarmed water into the water jacket means adjacent the discharge exhaust passage. The unwarmed water flowing into the second inlet is either water which bypasses the engine cooling system, or which is circulated therethrough but is unwarmed by the engine. In one embodiment, an exhaust discharge elbow is connected to the exhaust manifold. An exhaust passage having an exhaust outlet is provided in the elbow, and communicates with the exhaust cavity for discharging exhaust therefrom. A first water jacket means is provided around the exhaust elbow. Dam means is disposed between the first and second water jacket means. Water passage means, such as a passage over the dam means, allows fluid communication between the first and second water jacket means. The first inlet introduces warm water into the first water jacket means, and a second inlet introduces unwarmed water across the top of the first or into the second water jacket means adjacent the passage in the dam means.

BRIEF DESCRIPTION OF THE DRAWINGS

The drawings illustrate the best mode presently contemplated of carrying out the invention.

In the drawings.

DETAILED DESCRIPTION OF THE PRIOR ART

Figure 1:
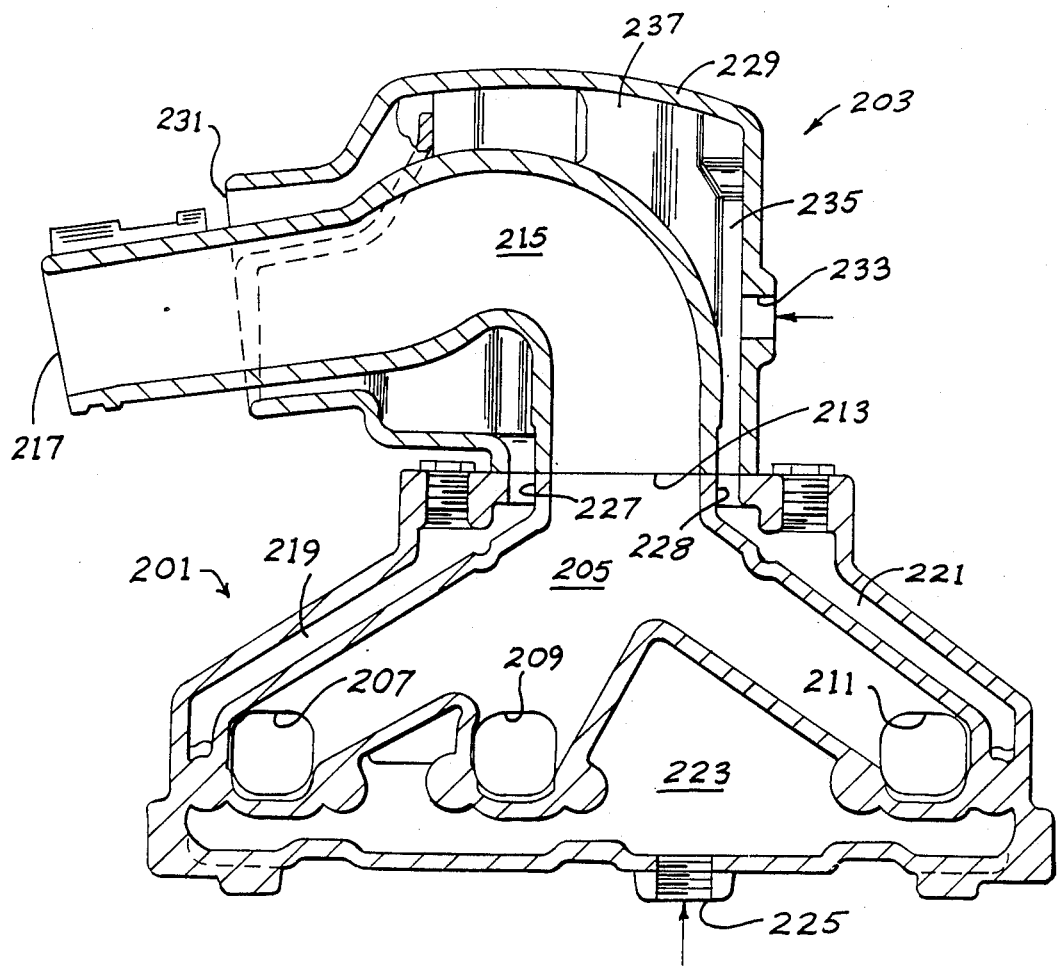
FIG. 1 is a sectional view of a prior art two-piece exhaust manifold/exhaust elbow system.

With reference to FIG. 1, a prior art system for discharging exhaust and cooling water includes an exhaust manifold 201 to which an exhaust elbow 203 is mounted. Manifold 201 includes an exhaust collecting cavity 205 which receives engine exhaust through a plurality of inlets 207, 209, 211. An exhaust discharge outlet 213 is provided at the upper end of manifold 201, so that exhaust is discharged into an exhaust passage 215 provided in exhaust elbow 203 for ultimate discharge through discharge end 217 of exhaust elbow 203.

Manifold 201 is water jacketed, including water passages as shown at 219, 221, 223. An inlet 225 is provided in the bottom wall of manifold 201 for introducing water into the manifold water jacket at certain conditions, as will be explained. Manifold water jacket outlets, such as shown at 227, 228, are provided at the upper end of manifold 201 for discharging water therefrom.

The details of construction of exhaust elbow 203 are set forth in U.S. Pat. No. 4,573,318 to Entringer et al, the disclosure of which is hereby incorporated by reference. For purposes of explanation, an overview of the construction of exhaust elbow 203 is provided.

As noted previously, exhaust elbow 203 includes an exhaust passage 215, which has a substantially vertical inlet portion which communicates through a bend to a substantially horizontal outlet portion.

Exhaust elbow 203 includes a water jacket 229, which has inlets in communication with manifold water jacket outlets 227, 228 for allowing water flow upwardly from manifold 201 through exhaust elbow 203 for ultimate discharge through an outlet 231 provided at the leftward end of water jacket 229.

An inlet 233 is provided in the rightward sidewall of water jacket 229 for introducing cooling water into the water jacket around exhaust passage 215. Inlet 233 communicates with a central channel section 235, from which water is directed by means of a pair of sidewalls, one of which is shown at 237, over the top of exhaust passage 215. A sidewall similar to that shown at 237 is spaced from sidewall 237 so that a restricted water passage is provided therebetween.

Cooling water is constantly supplied to exhaust elbow inlet 233 both at start-up and after the engine cooling water is sufficiently warmed to open the thermostat. Warmed cooling water is introduced into inlet 225 in the bottom of exhaust manifold 201 when the thermostat is open.

At start-up and prior to opening of the thermostat, the only flow occurs through exhaust elbow inlet 233. In this situation, water present in the water jacket around exhaust manifold 201 remains in place, and water introduced through exhaust elbow inlet 233 flows upwardly through central channel section 235 and through the restricted area provided between the sidewalls atop exhaust passage 215, one of which is shown at 237. Such water then continues flowing over exhaust passage 215 and is ultimately discharged from outlet 231.

After water is sufficiently warmed to open the thermostat, warmed water introduced through exhaust manifold inlet 225 flows upwardly through water passages 219, 221 and 223 and is discharged into exhaust elbow 203 through outlets 227, 228. This water then mixes with water introduced through exhaust elbow inlet 233 for ultimate discharge through outlet 231.

Figure 2:
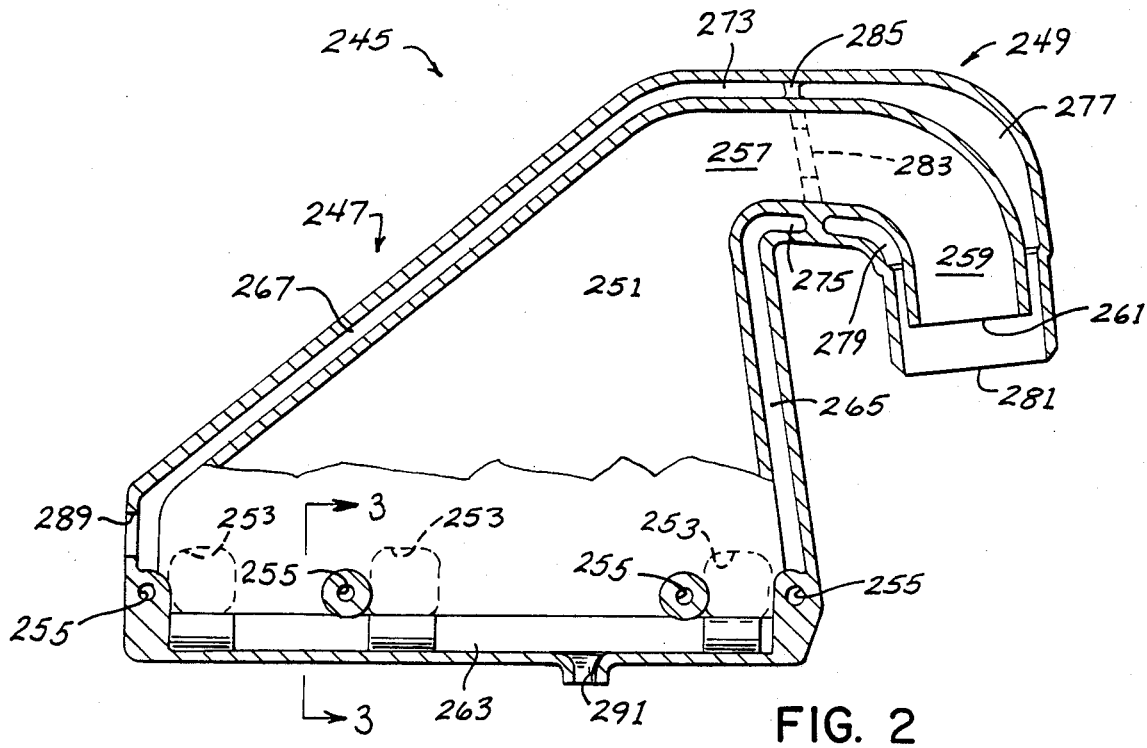
FIG. 2 is a sectional view somewhat similar to FIG. 1 showing a prior art one-piece exhaust manifold/exhaust elbow system.

With reference to FIG. 2, a one-piece prior art exhaust discharge assembly 245 includes a manifold portion 247 and an exhaust elbow portion 249. An exhaust cavity 251 is provided in manifold portion 247 for receiving engine exhaust through exhaust inlet passages 253. A series of apertures 255 are formed in and through the lower portion of manifold portion 247 for receiving bolts to mount assembly 245 to an engine.

An upper exhaust passage 257 is provided in the upper portion of manifold portion 249 for discharging exhaust therefrom into an exhaust passage 259 formed in elbow portion 249. Exhaust passage 259 leads to an exhaust discharge outlet 261.

Figure 3:
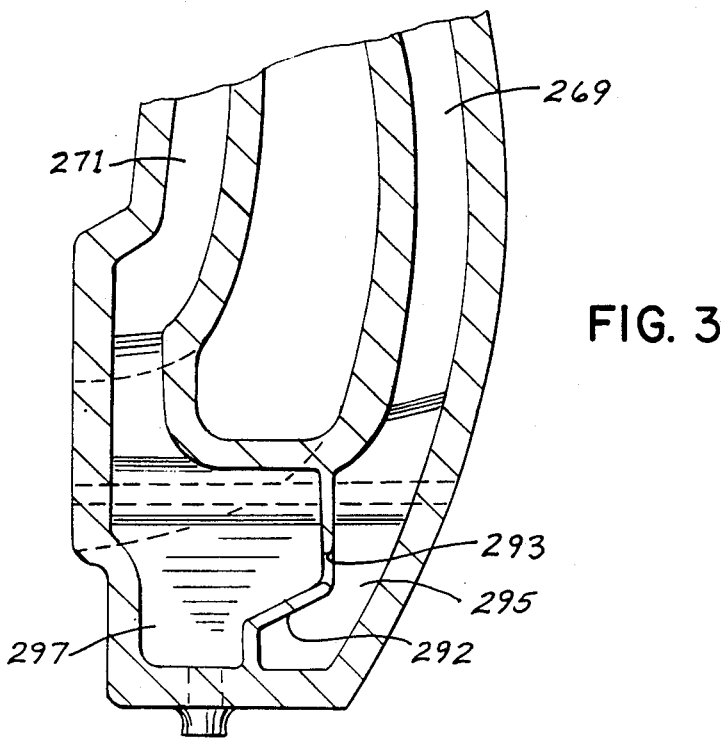
FIG. 3 is a sectional view taken generally along line 3—3 of FIG. 2.

A cooling water jacket is provided around manifold portion 247 for cooling exhaust contained within exhaust cavity 251 prior to discharge of such exhaust. The water jacket around exhaust cavity 251 includes a bottom portion 263 and front and rear portions 267, 265, respectively. With reference to FIG. 3, the water jacket around exhaust cavity 251 further includes right and left side portions 269, 271, respectively. An upper portion 273 and a lower portion 275 are provided around upper exhaust passage 257.

A cooling water jacket is also provided around elbow portion 249, including top and bottom portions 277, 279, respectively. Side portions (not shown) provide circulation of cooling water around the sides of elbow portion 249. A water discharge outlet 281 is provided at the lower end of the water jacket downstream of exhaust outlet 261. A mixing tube or other satisfactory device (not shown) is mounted to the lower end of exhaust elbow portion 249 for discharging mixed exhaust and cooling water.

A dam 283 substantially separates the cooling water jackets provided around manifold portion 247 and elbow portion 249. An upper passage 285 is formed in the upper portion of dam 283.

An inlet 289 is provided at the lower front area of manifold portion 247 for introducing water from the engine cooling system into the manifold water jacket. A drain opening 291 is provided in the lower wall of manifold portion 247, and is in communication with bottom water jacket portion 263. Depending upon the application in which assembly 245 is used, either opening 291 or inlet 289 is employed for introducing water into the manifold water jacket. For purposes of further explanation, it will be assumed that inlet 289 is utilized for introducing water into the manifold water jacket, and opening 291 is plugged.

In the prior art system in which assembly 245 is utilized, water is always supplied to inlet 289 for circulation through the manifold water jacket. The circulated water includes water discharged from the engine cooling system, as well as any overflow intake water which bypasses the engine cooling system. The excess water is mixed with discharged engine cooling water prior to introduction through inlet 289. With this arrangement, prior to engine warm-up, cold water is introduced through inlet 289, which results in moisture condensing out of exhaust contained within exhaust cavity 251. Additionally, with the structure as shown and described, a hot spot is formed at the lower right area of manifold portion 247. The hot spot is a result of inadequate water circulation in this area, in that water flow through the manifold water jacket tends to move in a direction from the lower left to the upper right, resulting in inadequate circulation through the lower right portion of the manifold water jacket.

With reference to FIG. 3, in certain portions of bottom water jacket portion 263, a wall 291 having an opening 293 is formed. With the described construction, a water passage 295 is provided to the right of wall 292, and the area 297 to left of wall 292 is obstructed. It has been found that this arrangement provides unsatisfactory water flow through bottom water jacket portion 263.

DETAILED DESCRIPTION OF THE INVENTION

Figure 4:
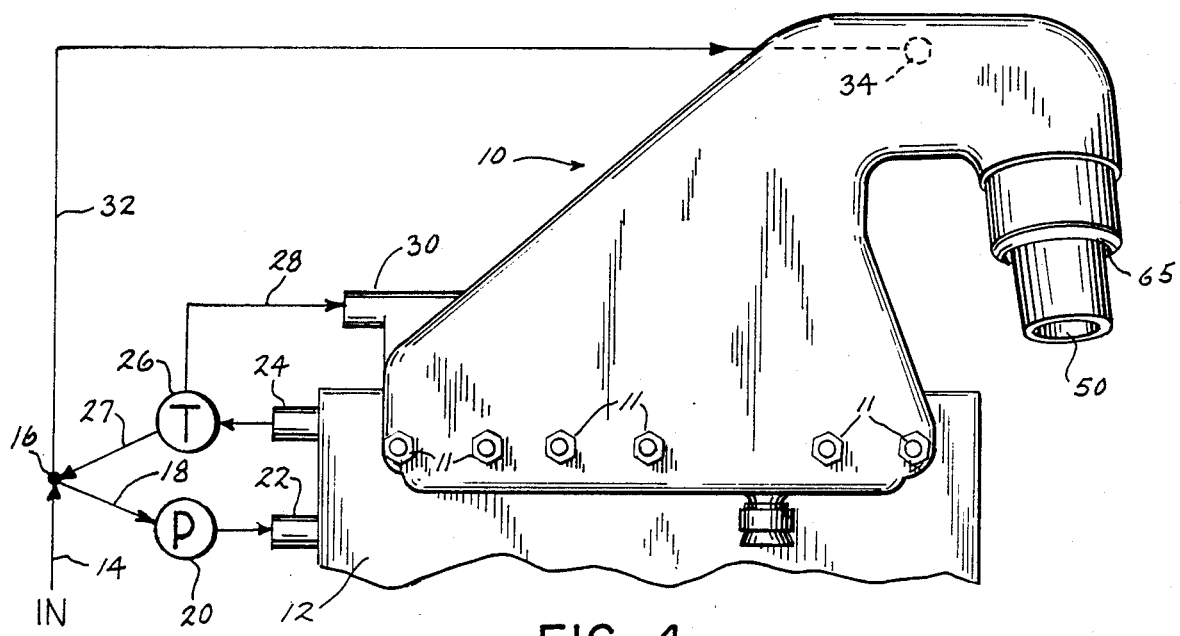
FIG. 4 is a side elevation view showing the combination exhaust manifold and exhaust elbow of the invention mounted on an engine, with the coolant water circulation system shown schematically.

With references to FIG. 4, an exhaust discharge assembly 10 is connected by means of bolts 11 to an internal combustion engine, schematically presented at 12. The water circulation system for engine 12 is shown schematically, and includes an inlet line 14 connected to a fitting 16. A line 18 leads from fitting 16 to a circulating water pump 20. Pump 20 is adapted to pump cooling water into one or more engine cooling water inlets, schematically shown at 22. The cooling water then flows through the cooling system provided in engine 12 as is well known, and exits from engine 12 via one or more cooling water outlets, shown schematically at 24. The cooling water exiting engine 12 through outlet 24 flows to a temperature flow control means, such as a thermostatic valve 26. A connection 27 is provided between thermostatic valve 26 and fitting 16 so as to allow water flow therebetween. Thermostatic valve 26 is also connected via a line 28 to a warm water inlet 30 provided in the lower portion of exhaust discharge assembly 10. A line 32 connects fitting 16 to a cold water inlet 34 provided in the upper portion of exhaust discharge assembly 10. Thermostatic valve 26 may be provided with a small bypass to allow limited flow when in its closed condition to stabilize temperature within the engine cooling system.

During start-up and low speed operation, cooling water exiting engine 12 through outlet 24 is not sufficiently warmed by engine 12 to cause thermostatic valve 26 open, thus providing no significant flow in line 28 leading to warm water inlet 30. Such unwarmed water then either reenters the engine cooling system via line 18 or is routed via line 32 to cold water inlet 34 provided on exhaust discharge assembly 10. After warm-up, engine cooling water exiting engine 12 via outlet 24 is sufficiently warmed to cause thermostatic valve 26 to open. Such warmed water is then routed via line 28 to warm water inlet 30 provided on exhaust discharge assembly 10. Excess warmed water which does not pass into line 28 is routed via connection 27 to fitting 16 and mixed with cold incoming water for recirculation through the engine cooling system.

Excess cooling water flowing into fitting 16 via line 14 which does not pass into pump 20 via line 18 is bypassed through line 32 to cold water inlet 34 provided on exhaust discharge assembly 10.

Figure 5:
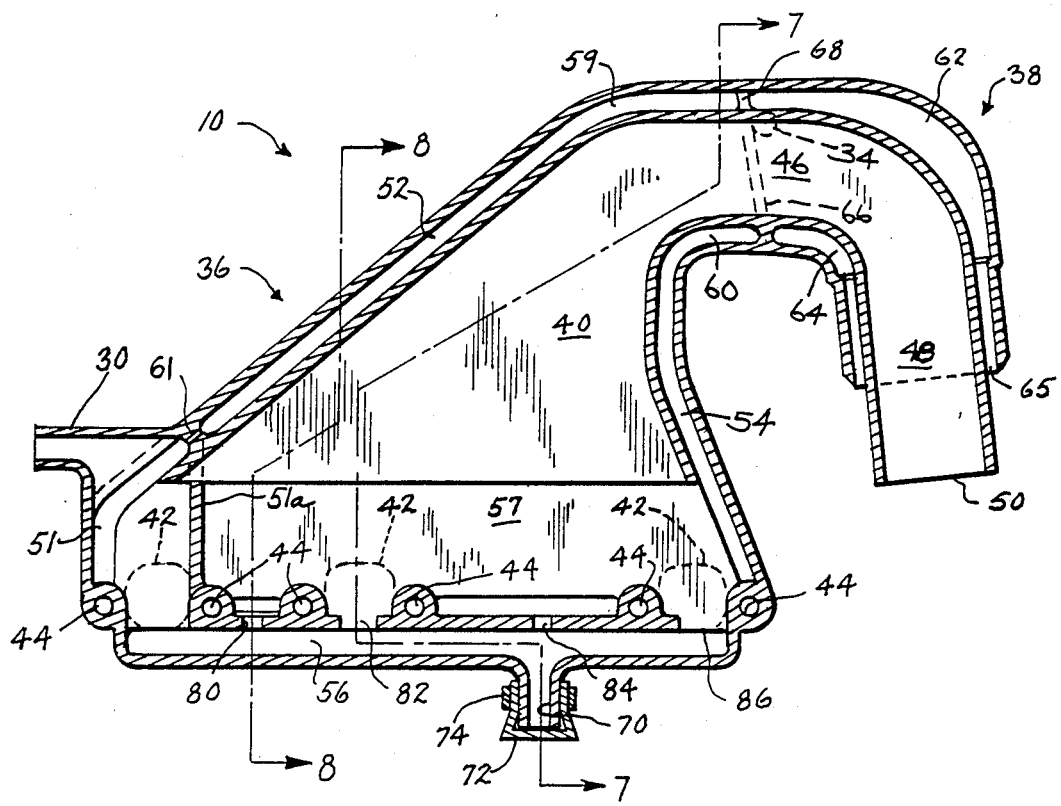
FIG. 5 is a sectional view showing the internal configuration of the combination exhaust manifold and exhaust elbow of FIG. 4 taken generally along line 5—5 of FIG. 7.

With reference to FIG. 5, exhaust discharge assembly 10 includes a manifold portion 36 and an exhaust elbow portion 38. An exhaust cavity 40 is provided in manifold portion 36 for receiving exhaust from engine 12. Exhaust inlet passages 42 are provided in the lower portion of manifold portion 36 for allowing exhaust to pass from engine 12 to exhaust cavity 40. A series of apertures 44 are formed in and through the lower portion of manifold portion 36 for receiving bolts 11 therethrough for mounting exhaust discharge assembly 10 to engine 12.

An exhaust passage 46 is provided in the upper portion of manifold portion 36 for discharging exhaust therefrom into an exhaust passage 48 formed in elbow portion 38. Exhaust passage 48 leads to an exhaust discharge outlet 50.

Figure 7:
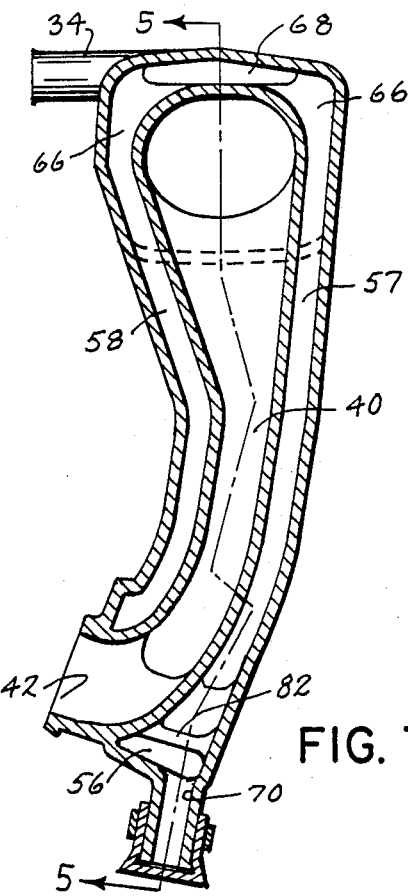
FIG. 7 is a sectional view taken generally along line 7—7 of FIG. 5.
Figure 8:
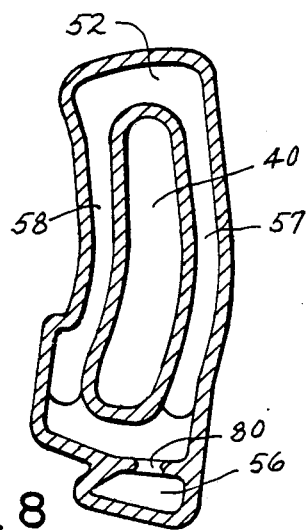
FIG. 8 is a sectional view taken generally along line 8—8 of FIG. 5.

As best shown in FIGS. 5 and 7, a cooling water jacket is provided around manifold portion 36 for cooling exhaust contained within exhaust cavity 40 prior to discharge of such exhaust. The water jacket around exhaust cavity 40 includes an inlet portion 51, a front portion 52, a rear portion 54, a ducting portion 56, and right and left side portions 57 and 58, respectively. An upper portion 59 and a lower portion 60 are provided around exhaust passage 46. A bleed passage 61 provides limited communication between water jacket front portion 52 and inlet portion 51.

A cooling water jacket is also provided around elbow portion 38, including top and bottom portion 62 and 64, respectively. Side portions (not shown) provide circulation of cooling water around the sides of elbow portion 38. A circumferential water discharge outlet 65 is provided at the lower ends of the water jacket around the exterior of exhaust passage 48. Water discharge outlet 65 is provided upstream of exhaust discharge outlet 50. The lower end of elbow portion 38 is adapted to receive a mixing tube or other such fitting for discharging mixed exhaust and cooling water from the boat. The placement of exhaust outlet 50 below water outlet 65 prevents cooling water from creeping upwardly through exhaust passage 48 and into exhaust cavity 40. Such ingestion of water can cause fouling and corrosion of engine 12 and of the interior surfaces of exhaust cavity 40.

A dam 66 substantially separates the cooling water jackets provided around manifold portion 36 and elbow portion 38. A passage 68 is formed in the upper portion of dam 66, providing fluid communication between upper portion 59 around exhaust passage 46 and top portion 62 around elbow portion 38.

Figure 6:
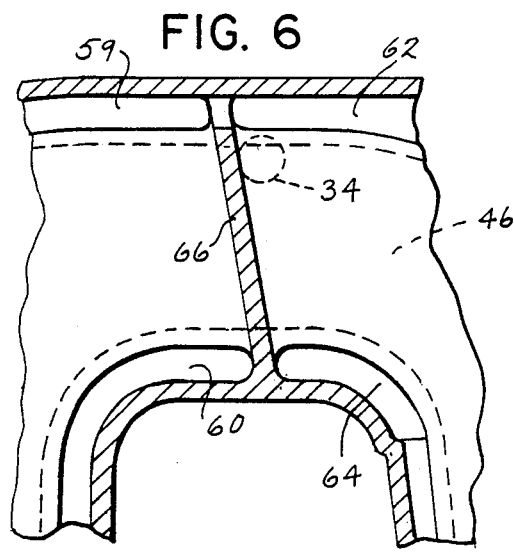
FIG. 6 is a detailed elevation view showing a dam provided in the water jacket means between the exhaust manifold and the exhaust elbow and placement of the second inlet.

As shown in FIGS. 5-7, a warm water inlet 30 introduces warm water into inlet portion 51 in the water jacket around manifold portion 36. Cold water inlet 34 is disposed adjacent dam 66, and introduces cold water into top portion 62 in the water jacket around exhaust passage 46.

A drain opening 70 is provided in bottom portion 56 in the water jacket around manifold portion 36. Drain opening 70 functions as a means for draining water from exhaust discharge assembly 10. In normal operation, drain opening 70 is closed off by means of a cap 72 clamped onto drain opening 70 by a clamp 74. However, drain opening 70 may be used as a warm water inlet in lieu of warm water inlet 30 in applications where inlet 30 is inaccessible. In this situation, line 28 would be connected to drain opening 70 and inlet opening 30 would be capped.

In operation, exhaust discharge assembly 10 functions as follows. On start up and during low speed operation, cooling water flowing through engine 12 is not sufficiently warmed by engine 12 to cause thermostatic valve 26 to open. The cooling water is then recirculated through engine 12 or is bypassed via line 32 to cold water inlet 34. Such unwarmed water entering cold water inlet 34 passes into top and bottom portions 62 and 64, respectively, in the water jacket around elbow portion 38 and is discharged therefrom via water outlet 65. In this situation the water flow is relatively low, since the flow of engine cooling water supplied by pump 20 is proportional to engine speed.

During start-up and low speed operation, there is little if any circulation in the water jacket around exhaust cavity 40. Thus, cooling water contained therein during such operation will be sufficiently warmed by exhaust flowing through cavity 40 so as to prevent condensation.

After warm-up, the engine cooling water is sufficiently warmed by engine 12 to cause thermostatic valve 26 to open and warm water to flow via line 28 to warm water inlet 30. Such warmed water then flows downwardly through inlet portion 51 by a wall 51a and into ducting portion 56, and then passes through a series of orifices 80, 82, 84 and 86 into the water jacket around exhaust cavity 40 to cool exhaust contained therein prior to its discharge via passage 46. This arrangement allows for a substantially even flow of circulating water to the walls of exhaust cavity 40. A small amount of such water passes directly from inlet portion 51 to water jacket front portion 52 through bleed opening 61. Opening 61 additionally allows any air which may enter through inlet portion 51 to escape upwards. Trapped air within the water jacket is known to create hot spots. The water circulates through the water jacket around exhaust cavity 40 and over dam 66 via passage 68 and into the water jacket around exhaust passage 46 and 48, where the warmed water mixes with unwarmed bypass water passing through inlet 34. The mixed water is then discharged through water discharge outlet 65.

The above-described operation is substantially similar in the event inlet 30 is capped and drain opening 70 is employed as the water inlet. In this situation, water flowing through opening 70 circulates through ducting portion 56 in the same manner as described above. Bleed opening 61 allows a limited amount of water to circulate through water jacket portion 51 and into front water jacket portion 52 for providing an even supply of circulating water to the walls of exhaust cavity 40 adjacent lower left exhaust inlet 42.

The circulation of relatively warm cooling water in the water jacket around exhaust cavity 40 allows the walls of cavity 40 to remain at a sufficiently high temperature that moisture does not condense out of exhaust passing through cavity 40. However, the temperature of the water circulating in the water jacket around exhaust cavity 40 is sufficiently low to cool the exhaust prior to its discharge.

Figure 9:
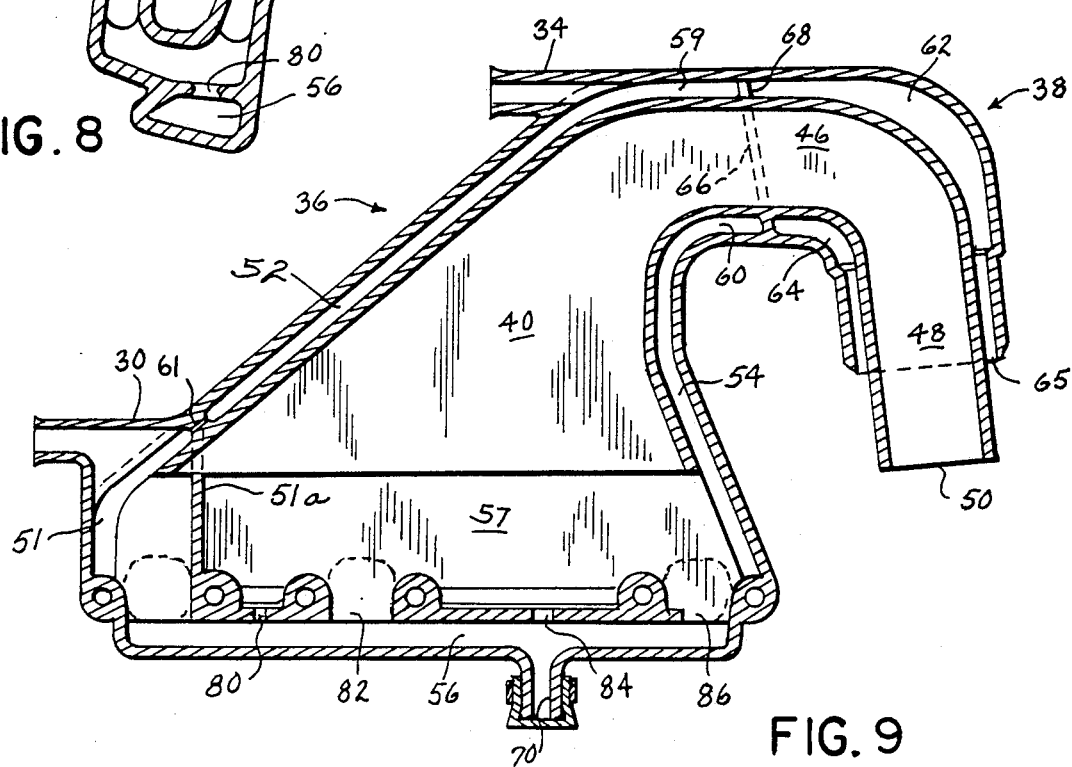
FIG. 9 is a sectional view similar to FIG. 5 showing an alternate location of the second inlet.

Another embodiment of exhaust discharge assembly 10 is shown in FIG. 9. Inlet 34 is located upstream of dam 66 and introduces cold water into upper portion 59 and 62 of the water jackets around exhaust cavity 40 and exhaust passage 46, respectively, in such a manner as to minimize the amount of turbulence introduced into the relatively quiescent water within the exhaust cavity water jacket. During start-up and low speed operation, there is again substantially no flow of warm water into warm water inlet 30 due to the action of thermostatic valve 26. The unwarmed water bypassing the engine cooling system via line 32 and entering cold water inlet 34 first enters or flows into portions 59-60 in the water jacket around exhaust cavity 40. This water is then sufficiently warmed by exhaust passing through exhaust cavity 40 to prevent moisture from condensing out of such exhaust. During continued low speed or cold operation, unwarmed water continues to be fed into cold water inlet 34, flowing through upper portion 59 and passage 68 into portions 62 and 64 in the water jacket around elbow portion 38 for discharge via discharge outlet 65. The water flow during such low speed or start-up operation is relatively low, and such low flow of unwarmed water through inlet 34, portion 59 and through passage 68 causes a minimal amount of turbulence so as not to disturb the warmed water contained within portions 52, 54, 56, 57, 58 and 60 in the water jacket around exhaust cavity 40 thereby preventing excessive cooling of the exhaust gases and subsequent moisture condensation. After warm-up, warm water is introduced into warm water inlet 30 and passes through the water jacket around exhaust cavity 40 as described previously. Cold bypass water flowing through line 32 and cold water inlet 34 is mixed with the warmed engine water prior to its passage through passage 68 and discharge via water discharge outlet 65. With the embodiment of FIG. 9, there is always flow of water through passage 68 and any debris contained within the cooling water is continually removed from passage 68.

Various alternatives and modifications are contemplated as being within the scope of the following claims particularly pointing out and distinctly claiming the invention.

We claim:

1. An assembly for cooling exhaust from an internal combustion engine, comprising:
 a manifold including an exhaust cavity for receiving exhaust from said engine;
 a discharge exhaust passage leading from said exhaust cavity for discharging exhaust therefrom;
 first water jacket means around said exhaust cavity;
 second water jacket means around said discharge exhaust passage;
 means separating said first and second water jacket means, and including passage means providing communication therebetween;
 a first inlet for introducing water into said first water jacket means, said first inlet receiving engine cooling water after warm-up of said engine cooling water to a predetermined temperature;
 a second inlet for receiving overflow cooling water or engine cooling water prior to warm-up of said engine cooling water to said predetermined temperature; and
 means for preventing turbulence of water disposed within said first water jacket means during supply of water to said second inlet.

2. The assembly according to claim 1, wherein said turbulence preventing means comprises said second inlet being disposed adjacent said means separating said first and second water jacket means and downstream thereof for introducing water to said second water jacket means around said discharge exhaust passage.

3. The assembly according to claim 2, wherein a temperature sensitive flow control means controls the supply of warmed water to said first inlet so that during start-up or low speed operation, engine cooling water is not sufficiently warmed to open said temperature sensitive flow control means so that substantially no water is supplied to said first inlet, and so that after warm-up of said engine, engine cooling water is sufficiently warmed to open said temperature sensitive flow control means to supply warmed water to said first inlet.

4. The assembly according to claim 2, wherein said means separating said first and second water jacket means comprises dam means, and wherein said passage means is provided adjacent the uppermost point of said dam means.

5. The assembly according to claim 1, wherein said turbulence preventing means comprises said second inlet being disposed adjacent said means separating said first and second water jacket means and upstream thereof, and being substantially in alignment with said passage means so that water introduced into said second inlet flows through said passage means and into said second water jacket means.

6. The assembly according to claim 5, wherein a temperature sensitive flow control means controls the supply of warmed water to said first inlet so that during start-up or low speed operation, engine cooling water is not sufficiently warmed to open said temperature sensitive flow control means so that substantially no water is supplied to said first inlet, and water supplied to said second inlet under such conditions flows quiescently over water disposed in said first water jacket means and through said passage means into said second water jacket means for preventing mixing of water passing through said second inlet with water in said first water jacket means, and so that after warm-up of said engine, engine cooling water is sufficiently warmed to open said temperature sensitive flow control means to supply warmed water to said first inlet, resulting in mixing of water introduced through said first and second inlets prior to passage of such water through said passage means.

7. The assembly according to claim 5, wherein said means separating said first and second water jacket means comprises dam means, and wherein said passage means is provided adjacent the uppermost point of said dam means, and said second inlet is disposed adjacent the uppermost point of said first water jacket means so that water introduced therethrough flows through the uppermost point of said first water jacket means over water disposed therein, and thereafter through said passage means.

8. An assembly for cooling exhaust from an internal combustion engine, comprising:
   an exhaust manifold having an internal cavity for receiving exhaust from said engine;
   first water jacket means around said exhaust cavity;
   an exhaust discharge elbow connected to said exhaust manifold and having an exhaust discharge passage in communication with said exhaust cavity for discharging exhaust therefrom through an exhaust discharge outlet provided in said exhaust elbow;
   second water jacket means around said exhaust elbow, said second water jacket means having a water discharge outlet;
   dam means disposed between said first water jacket means and said second water jacket means;
   water passage means through said dam means for allowing communication between said first water jacket means and said second water jacket means;
   a first inlet for introducing water into said first water jacket means;
   a second inlet for introducing water into either said first or second water jacket means adjacent said water passage means;
   water supply means for supplying water to said second inlet; and
   temperature sensitive flow control means for controlling the supply of water to said first inlet so that, when engine cooling water is not sufficiently warmed to open said temperature sensitive flow control means, substantially no water is supplied to said first inlet, and so that, when engine cooling water is sufficiently warmed to open said temperature sensitive flow control means, said temperature sensitive flow control means provides flow of said unwarmed water to said first inlet.

9. The assembly according to claim 8, wherein said exhaust manifold and said exhaust elbow are integrally formed.

10. The assembly according to claim 8, wherein said water discharge outlet from said second water jacket means is disposed upstream of said exhaust discharge outlet.

11. The assembly according to claim 8, wherein said water passage means comprises a passage through said dam means, said passage being provided adjacent the uppermost point of said dam means.

12. The assembly according to claim 8, wherein said second inlet introduces water into said second water jacket means adjacent said water passage means at a point downstream of said dam means.

13. The assembly according to claim 8, wherein said second inlet introduces water into said first water jacket means upstream of said dam means, said second inlet being substantially aligned with said water passage means, so that during start-up or low speed operation of said engine, water flowing through said second inlet into said first water jacket means flows quiescently over water disposed in said first water jacket means and through said water passage means to said second water jacket means, and wherein water flowing through said first inlet into said first water jacket means after warm-up in response to said temperature sensitive flow control means mixes with water flowing through said second inlet prior to passing through said water passage means.

14. A water jacketed exhaust elbow for use on an internal combustion engine, said exhaust elbow being adapted for interconnection with the cooling system and exhaust system of said engine, said cooling system including a temperature sensitive flow control valve and a warm water coolant line interconnected between said temperature sensitive flow control valve and said exhaust elbow, said cooling system further including an unwarmed water coolant line interconnected between said temperature sensitive flow control valve and said exhaust elbow, said exhaust elbow comprising:
   a manifold including an exhaust cavity for receiving exhaust from said engine;
   a discharge exhaust passage leading from said exhaust cavity for discharging exhaust therefrom;
   first water jacket means around said exhaust cavity;
   second water jacket means around said discharge exhaust passage;
   means separating said first and second water jacket means, and including passage means providing communication therebetween;
   a first inlet in communication with said warm water coolant line for introducing warmed water into said first water jacket means when the temperature of said warmed water is sufficient to open said temperature sensitive flow control valve; and
   a second inlet in communication with said unwarmed water coolant line for introducing unwarmed water at a location adjacent said discharge exhaust passage.

15. An assembly for cooling exhaust from an internal combustion engine, comprising:
   a manifold including an exhaust cavity;
   one or more exhaust inlets for receiving exhaust from said engine and introducing exhaust into said exhaust cavity;
   said jacket means around said exhaust cavity and including a water jacket outlet for discharging water therefrom, and further including a lower wall defining the lower extent of said water jacket means, with said water jacket means above said lower wall defining a common cavity through which said one or more exhaust inlets extend so that the common cavity of said water jacket means substantially surrounds said one or more exhaust inlets;
   an inlet for introducing water into said water jacket means; and
   means between said inlet and said water jacket means for providing substantially even circulation of water to said one or more exhaust inlets prior to circulation of said water through said water jacket means, comprising a duct below said lower wall for receiving water from said inlet prior to circulation through said water jacket means, and passage means providing communication through said lower wall between said duct and said water jacket means for providing water to said water jacket means.

16. An assembly for cooling exhaust from an internal combustion engine, comprising:

a manifold including an exhaust cavity;
one or more exhaust inlets for receiving exhaust from said engine and introducing exhaust into said exhaust cavity;
water jacket means around said exhaust cavity and including a water jacket outlet for discharging water therefrom;
an inlet disposed in a side of said assembly for introducing water into said water jacket means; and
means between said inlet and said water jacket means for providing substantially even circulation of water to passages around each of said one or more exhaust inlets prior to circulation of said water through said water jacket means, comprising ducting means disposed in the lower portion of said assembly and in communication with said inlet for receiving water prior to circulation through said water jacket means, said ducting means providing unobstructed flow of water from said inlet to an area adjacent each said exhaust inlet prior to circulation of water through said water jacket means, and wherein said even circulation providing means further comprises a wall disposed adjacent said inlet for directing a major portion of water from said inlet downwardly to said ducting means.

17. An assembly for cooling exhaust from an internal combustion engine comprising:
a manifold including an exhaust cavity for receiving exhaust from said engine;
one or more exhaust inlets for receiving exhaust from said engine and introducing exhaust into said exhaust cavity;
a discharge exhaust passage leading from said exhaust cavity for discharging exhaust therefrom;
first water jacket means around said exhaust cavity;
ducting means around said exhaust inlets and providing communication with said first water jacket means;
second water jacket means around said discharge exhaust passage;
means separating said first and second water jacket means, and including first passage means providing communication therebetween;
a first inlet for introducing water into said first water jacket means and said ducting means;
a second inlet for introducing cooling water;
means for preventing turbulence of water disposed within said first water jacket means during introduction of water by said second inlet.

18. An assembly as claimed in claim 17, further comprising a means directing substantially all water introduced by first inlet to said ducting means.

19. An assembly as claimed in claim 18, wherein said directing means comprises second passage means in communication with said first water jacket means to permit air and other fluids to pass therebetween.

20. An assembly as claimed in claim 19, wherein said turbulence preventing means comprises said second inlet being disposed adjacent said means separating said first and second water jacket means and upstream thereof, and being substantially in alignment with said first passage means such that water introduced by said second inlet flows through said passage means and into said second water jacket means.

21. An assembly as claimed in claim 17, wherein said first inlet introduces only water warmed to above a predetermined temperature level.

22. An assembly as claimed in claim 19, wherein said first inlet introduces only water warmed to above a predetermined level.

* * * * *

UNITED STATES PATENT AND TRADEMARK OFFICE
CERTIFICATE OF CORRECTION

PATENT NO. : 4,977,741
DATED : December 18, 1990
INVENTOR(S) : Ricky H. Lulloff et al It is certified that error appears in the above-identified patent and that said Letters Patent is hereby corrected as shown below:

Claim 8, col 9, line 26:

Delete "through-" and substitute therefore -- through --.

Claim 15, col 10, line 44:

Delete "said" and substitute therefore -- water --.

Signed and Sealed this

Twenty-third Day of June, 1992

Attest:

DOUGLAS B. COMER

*Attesting Officer*  *Acting Commissioner of Patents and Trademarks*